US012701102B2

(12) United States Patent
Gajra et al.

(10) Patent No.: US 12,701,102 B2
(45) Date of Patent: Aug. 4, 2026

(54) UNIVERSAL SERIAL BUS DEVICE WITH SECURITY CHECK

(71) Applicant: INTERNATIONAL BUSINESS MACHINES CORPORATION, Armonk, NY (US)

(72) Inventors: Dimple Gajra, Austin, TX (US); Tiberiu Suto, Franklin, NY (US); Richard Howe, Mebane, NC (US); Nikki Elyse Robinson, Davidsonville, MD (US); David Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 18/431,450

(22) Filed: Feb. 2, 2024

(65) Prior Publication Data

US 2025/0254147 A1     Aug. 7, 2025

(51) Int. Cl.
H04L 9/40          (2022.01)
G06F 13/38         (2006.01)
G06F 13/42         (2006.01)

(52) U.S. Cl.
CPC ........ H04L 63/0245 (2013.01); G06F 13/382 (2013.01); G06F 13/4282 (2013.01); H04L 63/0471 (2013.01); G06F 2213/0042 (2013.01)

(58) Field of Classification Search
CPC ............. H04L 63/0245; H04L 63/0471; G06F 13/382; G06F 13/4282; G06F 2213/0042
See application file for complete search history.

(56) References Cited

U.S. PATENT DOCUMENTS 7,921,284 B1 *    4/2011   Kinghorn ................ H04L 63/06
                                                          713/160
8,209,739 B2     6/2012   Terpening
                      (Continued)

FOREIGN PATENT DOCUMENTS

CN          204332369 U      5/2015
CN          114428980 A      5/2022
                      (Continued)

OTHER PUBLICATIONS

International Searching Authority, "Notification of Transmittal of the International Search Report and the Written Opinion of the International Searching Authority, or Declaration," Patent Cooperation Treaty, Feb. 26, 2025, 16 pages, International Application No. PCT/EP2025/051046.

(Continued)

*Primary Examiner* — Lynn D Feild
*Assistant Examiner* — Kelah Janae Mcfarland-Barnes
(74) *Attorney, Agent, or Firm* — Stosch Sabo

(57)                    ABSTRACT

Described are techniques for Universal Serial Bus (USB) security. The techniques include intercepting, by a Universal Serial Bus (USB) firewall of a USB device connected to a host, a file access request for a file. The techniques further include transmitting the file access request for the file to an authorization server, where the authorization server determines whether the file access request for the file is permitted based on a hash of the file. The techniques further include receiving a cryptographically signed message from the authorization server based on the hash of the file, where the cryptographically signed message indicates whether the file access request for the file is permitted.

19 Claims, 7 Drawing Sheets

(56) References Cited

U.S. PATENT DOCUMENTS

| | | | |
|---|---|---|---|
| 8,245,292 B2 | 8/2012 | Buer | |
| 8,578,161 B2 * | 11/2013 | Smith | H04L 9/3252 |
| | | | 713/168 |
| 8,646,082 B2 | 2/2014 | Lomont | |
| 8,806,604 B2 | 8/2014 | Golde | |
| 9,792,294 B2 * | 10/2017 | Lin | G06F 16/1774 |
| 9,990,325 B2 | 6/2018 | Hetzler | |
| 10,462,142 B2 * | 10/2019 | Pattar | H04L 63/10 |
| 10,503,882 B2 * | 12/2019 | Mayo | G06F 21/51 |
| 10,715,509 B2 * | 7/2020 | Secatch | G06F 1/3287 |
| 11,121,864 B1 * | 9/2021 | Beck | H04L 9/3073 |
| 11,520,939 B2 * | 12/2022 | Beitler | G06F 21/85 |
| 2008/0082144 A1 | 4/2008 | Marcotte | |
| 2009/0249464 A1 | 10/2009 | Chang et al. | |
| 2009/0281598 A1 | 11/2009 | Haubrich | |
| 2009/0300356 A1 | 12/2009 | Crandell | |
| 2012/0131058 A1 * | 5/2012 | Farber | G06F 16/174 |
| | | | 707/E17.001 |
| 2016/0373408 A1 | 12/2016 | Wentworth | |
| 2018/0082047 A1 | 3/2018 | Mayo | |
| 2018/0232394 A1 * | 8/2018 | Danziger | G06F 16/172 |

FOREIGN PATENT DOCUMENTS

| | | |
|---|---|---|
| DE | 202014009240 U1 | 2/2015 |
| KR | 1020130040662 A | 4/2013 |

OTHER PUBLICATIONS

Liang et al., "Secure USB Based File System for BMC Applications." 2017 Second International Conference on Recent Trends and Challenges in Computational Models (ICRTCCM). IEEE, 2017. 6 pages.

Johnson et al. "Laissez-faire file sharing: Access control designed for individuals at the endpoints." Proceedings of the 2009 workshop on New security paradigms workshop. 2009. 9 pages.

Pham et al. "Threat analysis of portable hack tools from USB storage devices and protection solutions." 2010 International Conference on Information and Emerging Technologies. IEEE, 2010. 5 pages.

Tehami et al., "Hardware and software designing of USB based plug n play data acquisition device with C# and LabView compatibility." 2015 IEEE 21st International Symposium for Design and Technology in Electronic Packaging (SIITME). IEEE, 2015. 4 pages.

* cited by examiner

600

610

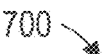

700

COMPUTER 701

PROCESSOR SET 710

| PROCESSING CIRCUITRY 720 | CACHE 721 |

COMMUNICATION FABRIC 711

VOLATILE MEMORY 712

PERSISTENT STORAGE 713

OPERATING SYSTEM 722

SECURE USB CODE 746

PERIPHERAL DEVICE SET 714

| UI DEVICE SET 723 | STORAGE 724 | IoT SENSOR SET 725 |

NETWORK MODULE 715

WAN 702

END USER DEVICE 703

REMOTE SERVER 704

REMOTE DATABASE 730

PRIVATE CLOUD 706

GATEWAY 740

PUBLIC CLOUD 705

| CLOUD ORCHESTRATION MODULE 741 | HOST PHYSICAL MACHINE SET 742 |
| VIRTUAL MACHINE SET 743 | CONTAINER SET 744 |

FIG. 7

UNIVERSAL SERIAL BUS DEVICE WITH SECURITY CHECK

BACKGROUND

The present disclosure relates to cybersecurity, and, more specifically, to Universal Serial Bus (USB) device security.

USB is a standard defining a data exchange and/or power delivery protocol for data processing systems. In particular, the USB protocol specifies physical interfaces and communication protocols between hosts (e.g., laptops, desktops, computers, etc.) and peripherals (e.g., displays, keyboards, storage devices, etc.).

SUMMARY

In some aspects, the techniques described herein relate to a computer-implemented method comprising intercepting, by a Universal Serial Bus (USB) firewall of a USB device connected to a host, a file access request for a file. The computer-implemented method further comprises transmitting the file access request for the file to an authorization server, where the authorization server determines whether the file access request for the file is permitted based on a hash of the file. The computer-implemented method further comprises receiving a cryptographically signed message from the authorization server based on the hash of the file, where the cryptographically signed message indicates whether the file access request for the file is permitted.

In some additional aspects, the techniques described herein relate to a computer-implemented method comprising receiving, at an authorization server communicatively coupled to a Universal Serial Bus (USB) device, a file access request for a file between the USB device and a host. The computer-implemented method further comprises determining that the file access request for the file is permitted based on a hash of the file. The computer-implemented method further comprises generating a cryptographically signed message that allows the file to be shared with the host. The computer-implemented method further comprises transmitting the cryptographically signed message to the USB device.

In some additional aspects, the techniques described herein relate to a system comprising a Universal Serial Bus (USB) device. The USB device comprises a USB firewall configured to intercept a file access request for a file between the USB device and a host. The USB device further comprises a USB communication subsystem configured to transmit the file access request for the file to an authorization server and receive a cryptographically signed message from the authorization server that allows the file to be shared with the host. The USB device further comprises a cache for storing the cryptographically signed message for a predetermined period of time. Additionally, the system further comprises the authorization server communicatively coupled to the USB device, where the authorization server is configured to determine that the file access request for the file is permitted based on a hash of the file, and where the authorization server is configured to generate the cryptographically signed message based on the hash of the file.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 7 illustrates a block diagram of an example computing environment, in accordance with some embodiments of the present disclosure.

Figure 1:
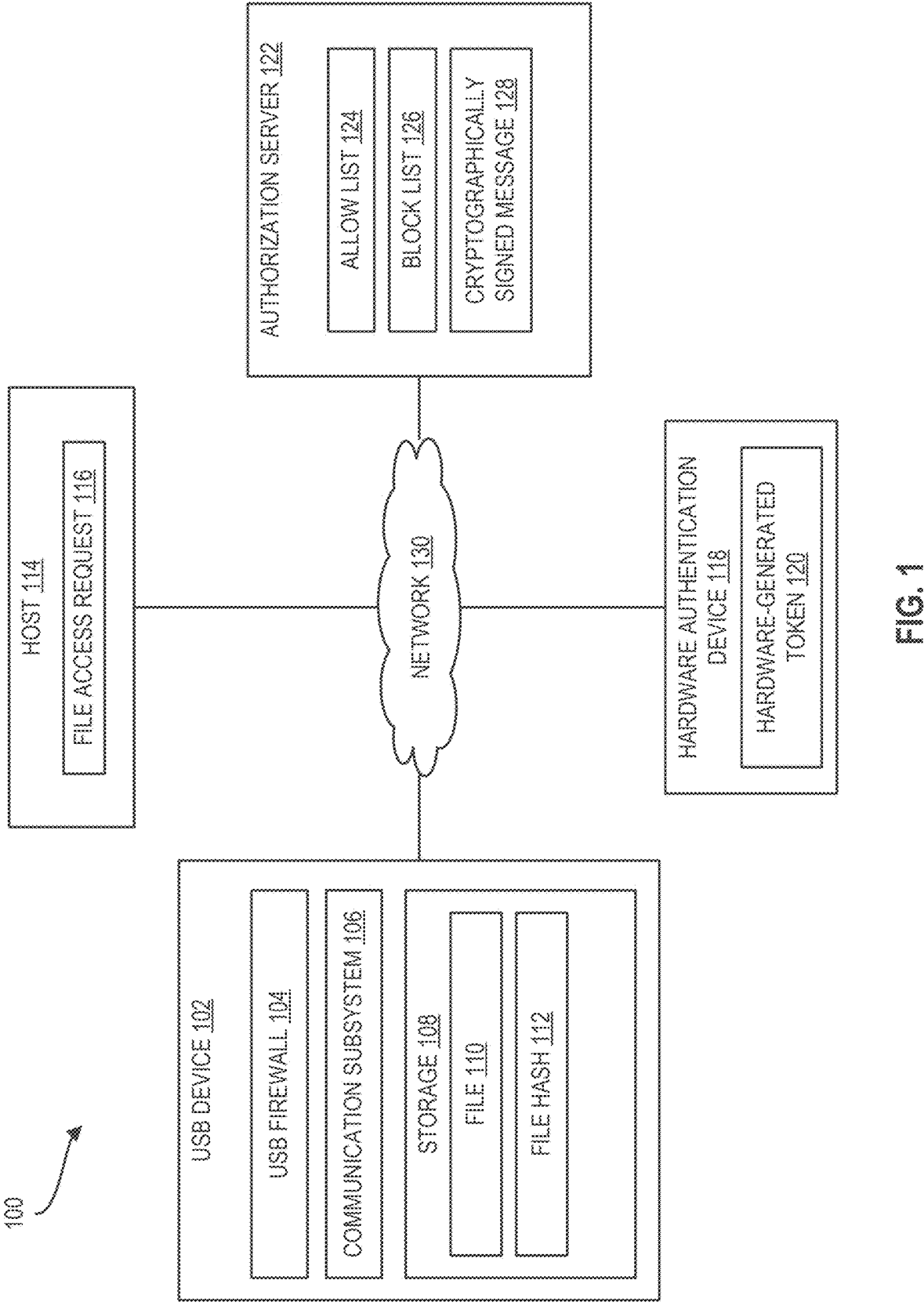
FIG. 1 illustrates a block diagram of an example system for USB operation with a security check, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward cybersecurity, and, more specifically, to Universal Serial Bus (USB) device security. While not limited to such applications, embodiments of the present disclosure may be better understood in light of the aforementioned context.

The following example clauses illustrate a non-limiting listing of aspects of the present disclosure. Clause 1 is a computer-implemented method comprising intercepting, by a Universal Serial Bus (USB) firewall of a USB device connected to a host, a file access request for a file. The method further comprises transmitting the file access request for the file to an authorization server, where the authorization server determines whether the file access request for the file is permitted based on a hash of the file. The method further comprises receiving a cryptographically signed message from the authorization server based on the hash of the file, where the cryptographically signed message indicates whether the file access request for the file is permitted. Advantageously, the aforementioned example increases security for USB devices by interacting with an authorization server to permit or deny a file access request.

Clause 2 includes the features of clause 1. In this example, the cryptographically signed message indicates that the file access request for the file is permitted, and where the method further comprises copying the file to the host in response to receiving the cryptographically signed message. Advantageously, the aforementioned example increases USB device security by only copying the file to the host in response to receiving the cryptographically signed message that indicates the file access request is permitted.

Clause 3 includes the features of clause 2. In this example, the method further comprises authenticating the USB device using a hardware-generated token of a hardware authentication device. Furthermore, the copying the file to the host occurs in further response to authenticating the USB device using the hardware-generated token of the hardware authentication device. Advantageously, usage of the hardware authentication device provides an additional layer of security to aspects of the present disclosure.

Clause 4 includes the features of clause 3. In this example, transmitting the file access request for the file to the authorization server further comprises transmitting the hardware-generated token to the authorization server. Advantageously, transmitting the hardware-generated token to the authorization server enables the authorization server to consider the hardware-generated token as a part of its determination of whether or not to permit the file access request.

Clause 5 includes the features of clause 4. In this example, the authorization server determining whether the file access request for the file is permitted is further based on the hardware-generated token and permission information associated with the file. Advantageously, transmitting the hardware-generated token to the authorization server enables the authorization server to consider the hardware-generated token as a part of its determination of whether or not to permit the file access request. More specifically, the authorization server can compare permissions associated with the hardware-generated token to the permission information associated with the file to determine whether or not to permit the file access request.

Clause 6 includes the features of any one of clauses 1 to 5. In this example, the method further comprises storing the cryptographically signed message in the USB device. The method further comprises intercepting, by the USB firewall of the USB device connected to the host, a subsequent file access request for the file. The method further comprises utilizing the cryptographically signed message associated with the file and the host to authorize the subsequent file access request. Advantageously, this aspect of the present disclosure reduces resource usage and network bandwidth associated with multiple, similar file access requests by reusing the cryptographically signed message.

Clause 7 includes the features of clause 6. In this example, the method further comprises automatically deleting the cryptographically signed message after a predetermined period of time. Advantageously, this aspect of the present disclosure manages the useful lifespan of the cryptographically signed message according to the predetermined period of time, thereby reducing the risk of a replay attack occurring days, weeks, or months after the file access request.

Clause 8 includes the features of clause 6. In this example, the method further comprises automatically deleting the cryptographically signed message in response to disconnecting the USB device from the host. Advantageously, this aspect of the present disclosure manages the useful lifespan of the cryptographically signed message according to a connection status of the USB device to the host, thereby reducing the risk of a replay attack occurring days, weeks, or months after the file access request.

Clause 9 includes the features of any one of clauses 1 to 8. In this example, the USB firewall is implemented by USB adapter hardware. Advantageously, USB adapter hardware can act as an intermediary between the USB device and the host, thereby enabling aspects of the present disclosure to be implemented on USB devices that may not have the inherent capability to implement aspects of the present disclosure.

Clause 10 includes the features of any one of clauses 1 to 8. In this example, the USB firewall is implemented by USB driver software. Advantageously, implementing the USB firewall on the USB driver software enables aspects of the present disclosure to be implemented on previously manufactured USB devices via a software/firmware update.

Clause 11 is a computer-implemented method comprising receiving, at an authorization server communicatively coupled to a Universal Serial Bus (USB) device, a file access request for a file between the USB device and a host. The method further comprises determining that the file access request for the file is permitted based on a hash of the file. The method further comprises generating a cryptographically signed message that allows the file to be shared with the host. The method further comprises transmitting the cryptographically signed message to the USB device. Advantageously, the aforementioned example increases security for USB devices by interacting with an authorization server to permit or deny a file access request.

Clause 12 includes the features of clause 11. In this example, the cryptographically signed message is based on the hash of the file. Advantageously, when the cryptographically signed message is based on the hash of the file, the cryptographically signed message can be unambiguously identified as related to the file. Furthermore, the authentication server can utilize the hash of the file as part of determining whether to permit or deny the file access request.

Clause 13 includes the features of any one of clauses 11 to 12. In this example, the method further comprises determining that a first authorization level associated with information stored in the file is compatible with a second authorization level associated with the host. Additionally, the cryptographically signed message is further based on determining that the first authorization level is compatible with the second authorization level. Advantageously, comparing authorization levels increases USB device security by enabling a mechanism to limit distribution of personal, confidential, or otherwise private information according to authorization levels.

Clause 14 includes the features of clause 13. In this example, the first authorization level is based on a hardware-generated token from a hardware authentication device, and where the second authorization level is based on a second hardware-generated token from a second hardware authentication device. Advantageously, hardware authentication devices provide a secure mechanism for identifying users involved in the file access request and thereby determining authorization levels associated with the involved users.

Clause 15 includes the features of any one of clauses 11 to 14. In this example, the method further comprises determining that the hash of the file matches at least one hash in a database of allowed file hashes. Advantageously, the database of allowed file hashes permits the file access request if the file access request is associated with a hash in the database of allowed file hashes (e.g., explicitly allowed files).

Clause 16 includes the features of any one of clauses 11 to 15. In this example, the method further comprises determining that the hash of the file does not match any hash in a database of blocked file hashes. Advantageously, the database of blocked file hashes denies the file access request if the file access request is associated with a hash in the database of blocked file hashes (e.g., explicitly disallowed files, such as file hashes associated with known malicious software).

Clause 17 is a system comprising one or more processors and one or more computer-readable storage media storing program instructions which, when executed by the one or more processors, are configured to cause the one or more processors to perform a method according to any one of clause 1 to clause 16. The aforementioned example can thus realize the corresponding advantages discussed above with respect to clause 1 to clause 16.

Clause 18 is a computer program product comprising one or more computer readable storage media, and program instructions collectively stored on the one or more computer readable storage media, the program instructions comprising instructions configured to cause one or more processors to perform a method according to any one of clause 1 to clause 16. The aforementioned example can thus realize the corresponding advantages discussed above with respect to clause 1 to clause 16.

Clause 19 is a system comprising a Universal Serial Bus (USB) device that includes a USB firewall configured to intercept a file access request for a file between the USB device and a host. The USB device further includes a USB communication subsystem configured to transmit the file access request for the file to an authorization server and receive a cryptographically signed message from the authorization server that allows the file to be shared with the host. The USB device further includes a cache for storing the cryptographically signed message for a predetermined period of time. Additionally, the system further comprises the authorization server communicatively coupled to the USB device, where the authorization server is configured to determine that the file access request for the file is permitted based on a hash of the file. Furthermore, the authorization server is configured to generate the cryptographically signed message based on the hash of the file. Advantageously, the aforementioned example increases security for USB devices by interacting with an authorization server to permit or deny a file access request.

Clause 20 includes the features of clause 19, further comprising a hardware authentication device communicatively coupled to the USB device and configured to generate a hardware-generated token associated with the file access request. Advantageously, the hardware authentication device provides an additional layer of security to the USB device.

Clause 21 includes the features of clause 20. In this example, the USB communication subsystem is further configured to transmit the hardware-generated token to the authorization server, and where the authorization server is further configured determine that the file access request for the file is permitted based on the hardware-generated token. Advantageously, the aforementioned example enables the authorization server to utilize the hardware-generated token as a component of determining whether to permit or deny the file access request.

Clause 22 includes the features of any one of clauses 19 to 21. In this example, the USB firewall is further configured to copy the file to the host in response to receiving the cryptographically signed message. Advantageously, the aforementioned example causes any copy operation between a USB device and a host to be dependent on approval from an authorization server, thereby increasing the security of the USB device, the host, and the file to be copied.

Aspects of the present disclosure can be relevant to multiple technical use cases. In one example technical use case, a USB hardware adapter includes at least one USB port and at least one hardware authentication port. Further, the USB hardware adapter can be configured (by original manufacture or subsequent software/firmware update) to implement a USB firewall and a communication subsystem for communicating with an authorization server. In so doing, the USB hardware adapter increases the security of file sharing between the USB device and a host by intercepting file access requests, communicating the file access request together with a hardware-generated token to the authorization server, and dispositioning the file access request based on a cryptographically signed message permitting or denying the file access request from the authorization server.

In another technical use case, a USB device is configured (by original manufacture or subsequent software/firmware update) to implement a USB firewall and a communication subsystem for communicating with an authorization server. In so doing, the USB device realizes increased file sharing security between the USB device and a host by intercepting file access requests, communicating the file access request to the authorization server, and dispositioning the file access request based on a cryptographically signed message permitting or denying the file access request from the authorization server.

In yet another technical use case, a host device (e.g., laptop, desktop, server, etc.) is configured (by original manufacture or subsequent software/firmware update) to implement a firewall and a communication subsystem for communicating with an authorization server regarding file sharing with any connected USB device. In so doing, the host device realizes increased file sharing security between any connected USB device and the host device by intercepting file access requests, communicating the file access request to the authorization server, and dispositioning the file access request based on a cryptographically signed message permitting or denying the file access request from the authorization server. In some embodiments, implementing aspects of the present disclosure on a host device (as opposed to one a USB device) is beneficial for mitigating data exfiltration.

At a high level, aspects of the present disclosure can mitigate the problem of malware being distributed via USB devices. For example, in the current environment, users can insert an infected USB device and inadvertently spread malware preloaded onto the USB device. Aspects of the present disclosure, on the other hand, utilize an authorization server in communication with the USB device to determine whether or not to share files between a USB device and a host, where the determination can be based on a danger of the file (e.g., malware), a confidentiality of the file, and/or an authorization level of the user attempting to access the file.

Currently there are limited approaches for controlling interactions between a USB device and a host. These limited approaches typically involve a global allow or global deny instruction to entirely allow or entirely deny interaction between the host and the USB device. In contrast, aspects of the present disclosure provide a granular, authorized approach that can vary permissions depending on file type, file contents, and/or other security factors that may be dynamically determined at the time of a file access request associated with the USB device.

Aspects of the present disclosure can be implemented using hardware and/or software. For hardware implemented embodiments, aspects of the present disclosure include a specially built USB adapter with at least two ports. One port can be a dedicated hardware token port and the other port(s) can support USB devices. In addition, a host port of the USB adapter can be configured to be the only port allowed connection to a host (e.g., by utilizing a setting enabled in the Basic Input/Output System (BIOS)). Furthermore, there can be a hardware token authentication required in order to enable the USB adapter to connect to the host. These aspects of the present disclosure can thus prevent an attacker from copying a file to a host even if they have the USB adapter that has been connected to that host.

In additional hardware implemented embodiments, the USB adapter can contain a communication subsystem configured to interface with the host and/or wired/wireless networks. This communication subsystem can be used to request cryptographically signed messages from a predetermined authorization server for enabling file operations on any particular file or a portion of a file. The cryptographically signed messages can authorize and enable read, write, delete or other such granular permissions on an entire file or a portion of a file. When only a portion of the file is permitted, the cryptographically signed message can specify data validity between the starting and ending offset in the file that is covered by the permission.

For software implemented embodiments, software can be loaded into a USB device, where the software is configured to perform some or all of the following operations. The USB driver for an associated system can be updated to contain a communication subsystem, hardware token module, authorization module, and a USB firewall. By default, the USB firewall can be in a deny state (e.g., any file operation on the USB bus is automatically denied). Any attempted operation on a file, or portion of a file, can generate a request to the authorization server which can calculate various scores in order to determine whether to permit or deny the request. The sources that can be used to generate the score can include checks on malicious software databases (e.g., Virus-Total®), defined allowed or non-allowed files or file types, and/or contents of a file relative to an authorization level for a particular user, among others. If the authorization server calculates a file allow score above a certain threshold and therefore deems the request valid and authorized, it transmits a cryptographically signed message specifying what file operations are allowed and on which portion of the file. The authorization module can supply the cryptographically signed message to the USB firewall, thereby enabling the specific file operations on that file or that portion of the file. Additionally, the cryptographically signed message can contain a time period that specifies for which time period the specific file operations are permitted.

As one example, an exemplary cryptographically signed message for signature verification using the Python® coding language is illustrated below:

```
from ecdsa import SigningKey
private_key=SigningKey.generate( )
signature=private_key.sign(b"Filename:     /mnt/usb1/
    Document1.docx Result: ALLOW")
print (signature)
public_key=private_key.verifying_key
print("Verified:", public_key.verify (signature, b"File-
    name: /mnt/usb1/Document1.docx Result: ALLOW"))
```

As shown above, the exemplary cryptographically signed message can be generated using an Elliptic Curve Digital Signature Algorithm (ECDSA) with a private_key, a file name (e.g., a hash of the file, a location of the file, a name of the file, etc.), and a result (e.g., ALLOW, DENY, etc.). Furthermore, the public_key can be generated using the private_key and the verifying_key. The example cryptographically signed message above is but one example, and many variations and alternatives are possible in other embodiments of the present disclosure.

Referring now to the figures, FIG. 1 illustrates a block diagram of an example system 100 for USB operation with a security check, in accordance with some embodiments of the present disclosure. The system 100 includes a USB device 102, host 114, hardware authentication device 118, and authorization server 122 communicatively coupled to one another via network 130.

The USB device 102, host 114, hardware authentication device 118, and authorization server 122 can each comprise hardware and/or software resources (whether physically present or virtually provisioned) to enable the storage, processing, and/or transmission of data between electronic devices. The USB device 102, host 114, hardware authentication device 118, and authorization server 122 can thus include processors, computer-readable storage media, computers, and/or other hardware components having executable instructions stored thereon.

The network 130 can be a local area network (LAN), a wide area network (WAN), an intranet, the Internet, or any other network 130 or group of networks 130 capable of continuously, semi-continuously, or intermittently connecting (directly or indirectly) the aforementioned components. In some embodiments, network 130 is consistent with WAN 702 of FIG. 7.

The USB device 102 can be any USB device now known or later developed. The USB device 102 can be referred to as a USB drive or a thumb drive, in other embodiments. In some embodiments, the USB device 102 can be a single USB device or a USB adapter having one or more ports for accepting one or multiple USB devices and/or hardware authentication devices 118 thereon. The USB device 102 includes a USB firewall 104, communication subsystem 106, and storage 108. The USB firewall 104 intercepts and manages commands and/or traffic between the USB device 102 and the host 114. The storage 108 includes a file 110 and file hash 112, where the file hash 112 is a hash generated from the file 110 (e.g., MD5 hash, SHA-256 hash, or any other hash now known or later developed). In some embodiments, the storage 108 can include a cache for temporarily storing information, such as a cryptographically signed message 128.

The host 114 comprises any device capable of being communicatively coupled to the USB device 102. For example, the host 114 can be a desktop or a laptop including a USB port, though in other embodiments, the host 114 can include a different type of port capable of communicating with the USB device 102 via one or more adapters. The host 114 can generate a file access request 116 for accessing the file 110 in the storage 108 of the USB device 102.

The USB firewall 104 of the USB device 102 can intercept the file access request 116 and the communication subsystem 106 can transmit the file access request 116 to the authorization server 122 with the file hash 112. In some embodiments, the communication subsystem 106 transmits the file access request 116 to the authorization server 122 with a hardware-generated token 120 generated by the hardware authentication device 118.

The hardware authentication device 118 can be any hardware authentication device now known or later developed. One example hardware authentication device is YubiKey®. The hardware authentication device 118 can be incorporated into the USB device 102 or communicatively coupled to the USB device 102 (e.g., directly coupled, or indirectly coupled via the host 114).

The authorization server 122 receives the file access request 116 and the file hash 112 and compares the file hash 112 to an allow list 124 and/or a block list 126. The allow list 124 can include hashes of files that are explicitly permitted to be shared between the USB device 102 and the host 114. The block list 126 can include hashes of files that are explicitly not permitted to be shared between the USB device 102 and the host 114. The block list 126 can be drawn from, for example, a database of known malicious files (e.g., VirusTotal®, etc.), an internal database of confidential, secret, or otherwise private files, and/or other sources. Based on comparing the file hash 112 to the allow list 124 and/or the block list 126, the authorization server 122 generates a cryptographically signed message 128 indicating that the file access request 116 is allowed or denied. In some embodiments, the authorization server 122 further utilizes the hardware-generated token 120 to compare a permission level (e.g., authorization level) of the host 114 to a permission level associated with the file 110. In some embodiments, the authorization server 122 further utilizes a content of the file 110 to determine whether or permit or deny the file access request 116.

The authorization server 122 can transmit the cryptographically signed message 128 to the USB device 102, and the USB device 102 can allow or deny the file access request 116 according to the determination included in the message. In some embodiments, the cryptographically signed message 128 is based on a ECDSA algorithm, a private key, a public key, the file hash 112, and an indication of whether the file access request 116 is permitted or denied. In some embodiments, the USB device 102 stores the cryptographically signed message 128 for a predetermined period of time (e.g., minutes, hours, etc.) in the storage 108 (e.g., a cache of the USB device 102) so that subsequent file access requests 116 from the same host 114 for the same file 110 within a valid timeframe can be dispositioned without the latency and/or processing overhead introduced by communicating with the authorization server 122. After the predetermined period of time, the cryptographically signed message 128 can be deleted from the internal storage 108 of the USB device 102 to prevent replay attacks. In other embodiments, the cryptographically signed message 128 is deleted form the storage 108 of the USB device 102 upon disconnecting the USB device 102 from the host 114.

While FIG. 1 illustrates aspects of the present disclosure being implemented primarily using a USB device 102, several of the components shown in the USB device 102 can, alternatively, but implemented at the host 114 so that the host 114 realizes increased protection from data exfiltration operations using the USB device 102. In such embodiments, the USB firewall 104 and communication subsystem 106 (and optionally the file hash 112) can reside in the host 114 rather than the USB device 102, and the host 114 can be configured to interact with the authorization server 122 to disposition a file access request 116.

Figure 2:
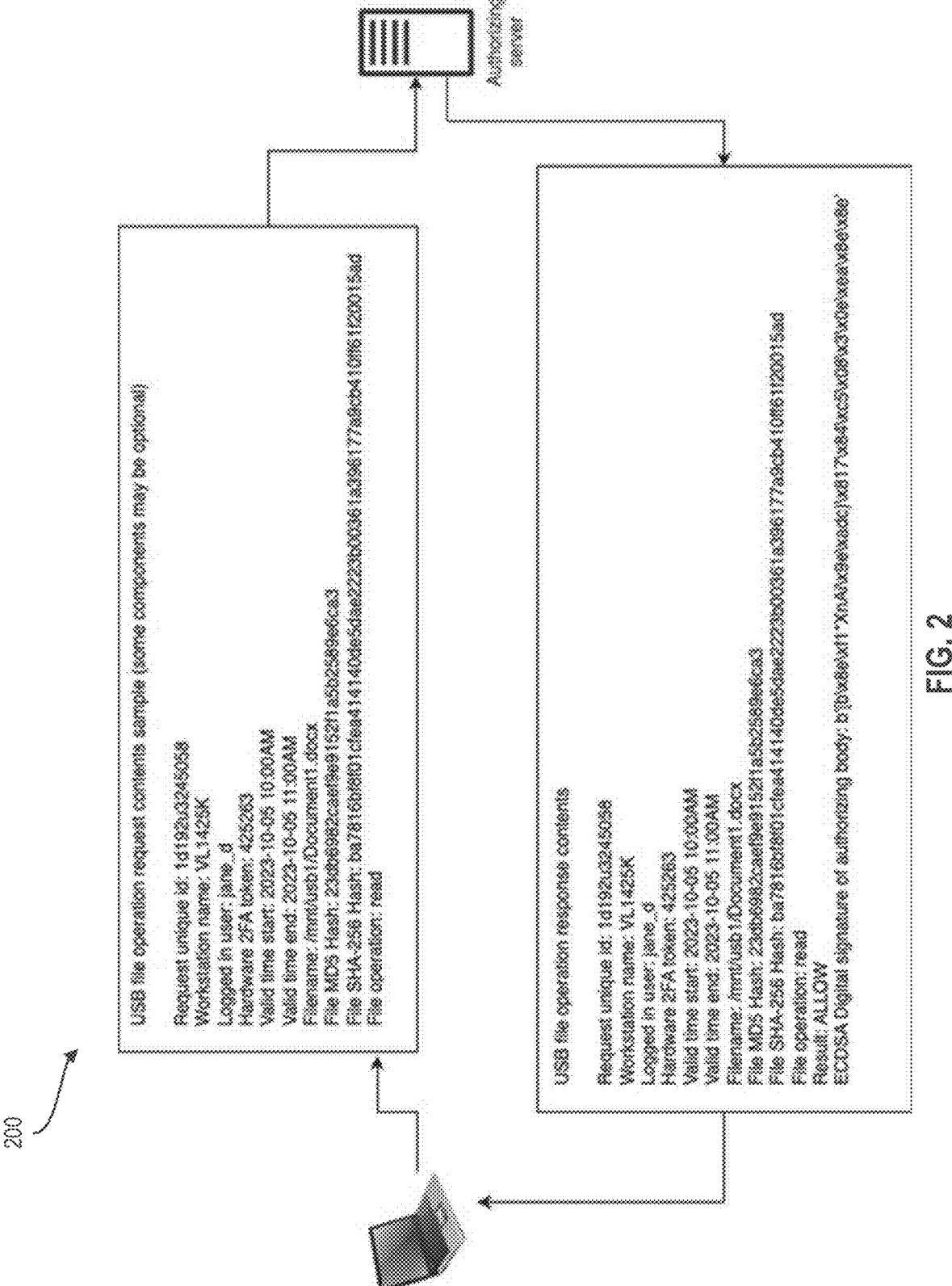
FIG. 2 illustrates a block diagram of example interactions between a USB device and an authorization server, in accordance with some embodiments of the present disclosure.

FIG. 2 illustrates a block diagram 200 of example interactions between a USB device in a laptop and an authorizing server, in accordance with some embodiments of the present disclosure. In the block diagram 200, a USB device in a laptop communicates with an authorization server. For example, the USB device in the laptop can send a request including an ID, a workstation name, a user name, a second factor token, a start time, an end time, a filename, an MD5 hash of the file, an SHA-256 hash of the file, and a file operation (e.g., read).

In response, the authorization server can reply with reply (e.g., a cryptographically signed message) including the above information and in addition to a result (e.g., ALLOW) and an ECDSA digital signature of the authorization server. The USB device in the laptop can then implement the result of the cryptographically signed message by allowing or denying the file access request.

Figure 3:
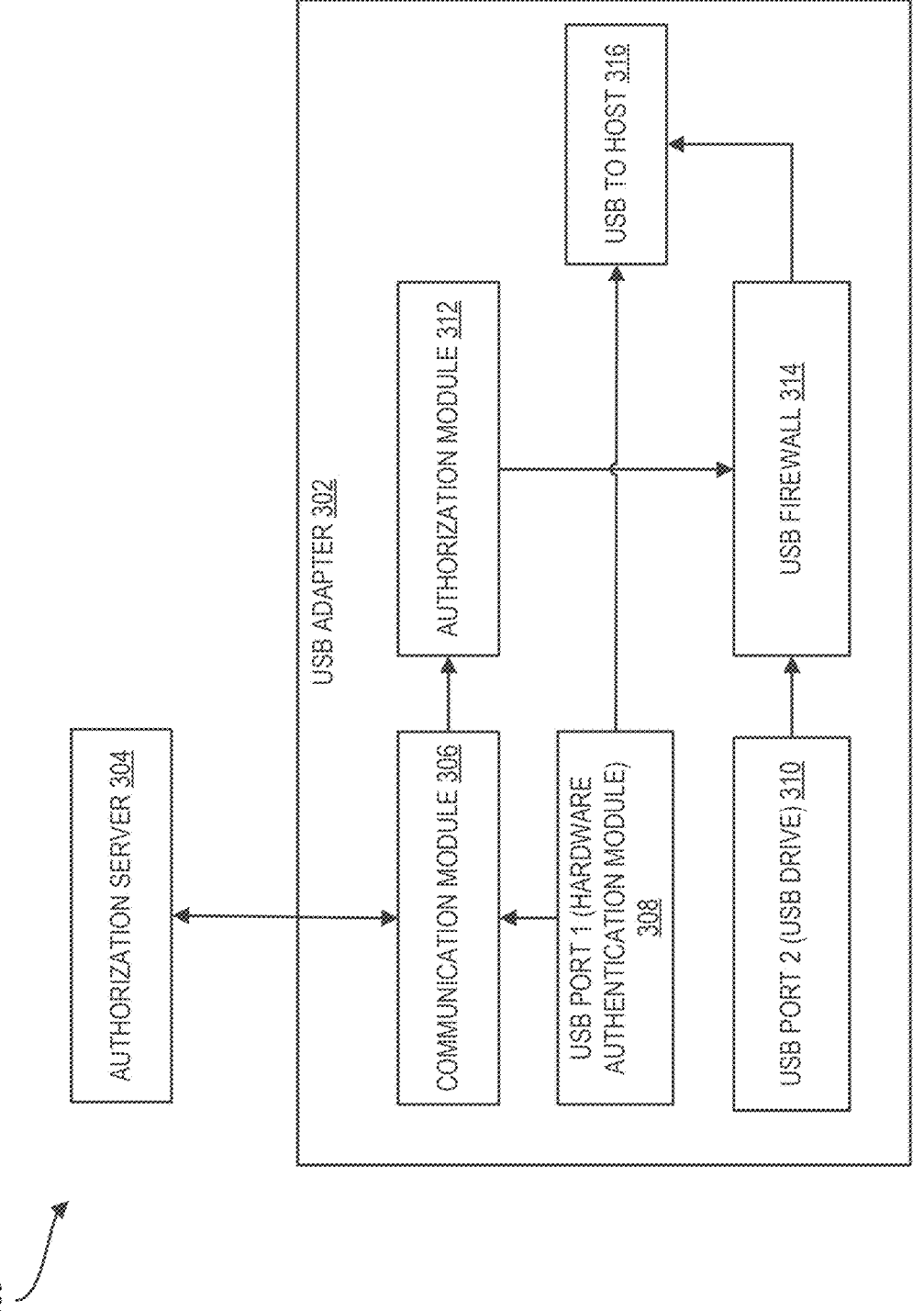
FIG. 3 illustrates a block diagram of an example system including a USB adapter in communication with an authorization server, in accordance with some embodiments of the present disclosure.

FIG. 3 illustrates a block diagram of an example system 300 including a USB adapter 302 in communication with an authorization server 304, in accordance with some embodiments of the present disclosure. The USB adapter 302 can include a communication module 306, USB port 1 (hardware authentication module) 308, a USB port 2 (USB drive) 310, an authorization module 312, a USB firewall 314, and a USB to host 316 connection. The communication module 306 can receive a hardware authentication token from the USB port 1 (hardware authentication module) 308. The communication module 306 can also interface with authorization server 304 to provide a file access request to the authorization server 304 and receive a cryptographically signed message from the authorization server 304. The communication module 306 can provide the cryptographically signed message from the authorization server 304 to the authorization module 312. The authorization module 312 can provide the cryptographically signed message to the USB firewall 314, and the USB firewall 314 can implement the cryptographically signed message (by allowing or denying a file access request) between the USB port 2 (USB drive) 310 and the USB to host 316 connection.

Figure 4:
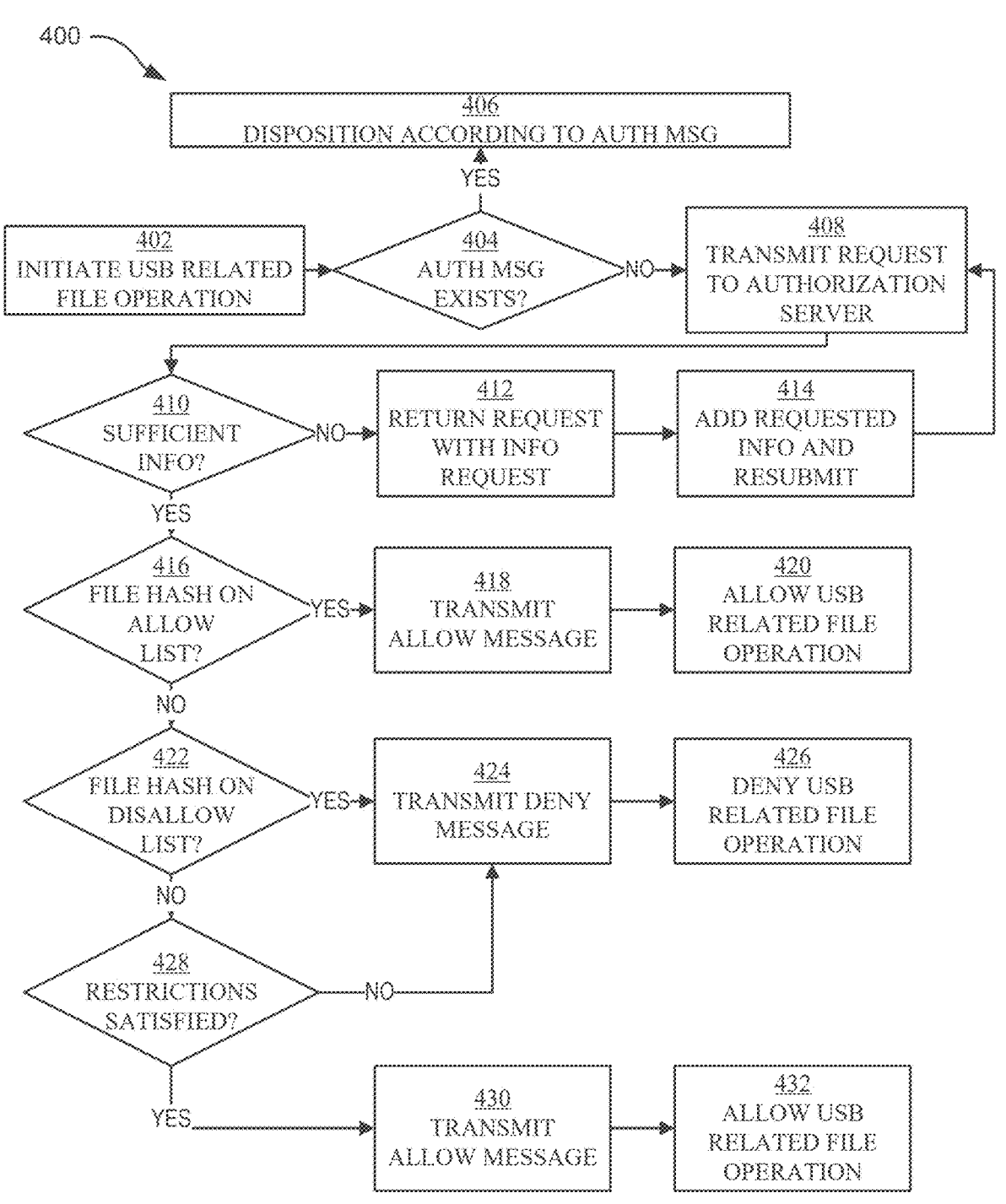
FIG. 4 illustrates a flowchart of an example method for performing a security check using a USB device, in accordance with some embodiments of the present disclosure.

FIG. 4 illustrates a flowchart of an example method 400 for performing a security check using a USB device, in accordance with some embodiments of the present disclosure. The method 400 can be implemented by, for example, a server, a computer, a processor, or another configuration of hardware and/or software. In some embodiments, the method 400 is implemented by one or more components of FIGS. 1-3.

Operation 402 includes initiating a USB related file operation (e.g., read, write, etc.). Operation 404 includes determining if a cryptographically signed message (e.g., authorization message) for the USB related file operation received in operation 402 already exists. If so (402: YES), then the method 400 proceeds to operation 406 and dispositions the USB related filed operation according to the existing authorization message. If not (404: NO), then the method 400 proceeds to operation 408 and transmits a file access request to an authorization server.

Operation 410 includes determining if the file access request includes sufficient information (e.g., file hash, hardware authentication token, etc.) to be evaluated by the authorization server. If not (410: NO), then the method 400 proceeds to operation 412 and returns the request to the USB device with a request for additional information. In operation 414, the USB device can add the requested information and resubmit the file access request in operation 408. If so (410: YES), then the method 400 proceeds to operation 416 and determines if a file hash associated with the file access request is on an allow list. If so (416: YES), then the method 400 proceeds to operation 418 and transmits a cryptographically signed allow message from the authorization server to the USB device and, in operation 420, the USB device allows the USB related file operation. If not (416: NO), then the method 400 proceeds to operation 422 and determines if the file hash associated with the file access request is on a disallow list (e.g., a block list). If so (422: YES), then the method 400 proceeds to operation 424 and transmits a cryptographically signed deny message from the authorization server to the USB device and, in operation 426, the USB device denies the USB related file operation.

If not (422: NO), then the method 400 proceeds to operation 428 and determines if various restrictions are satisfied (e.g., by comparing permission levels of the file and the host requesting access, by determining a privacy, confidentiality, or sensitivity of data in the file, etc.). If not (428: NO), then the method 400 proceeds to operation 424 and transmits a cryptographically signed deny message from the authorization server to the USB device and, in operation 426, the USB device denies the file access request according to the cryptographically signed deny message. If so (428: YES), then the method 400 proceeds to operation 430 and transmits a cryptographically signed allow message from the authorization server to the USB device and, in operation 432, the USB device allows the file access request based on the cryptographically signed allow message.

Figure 5:
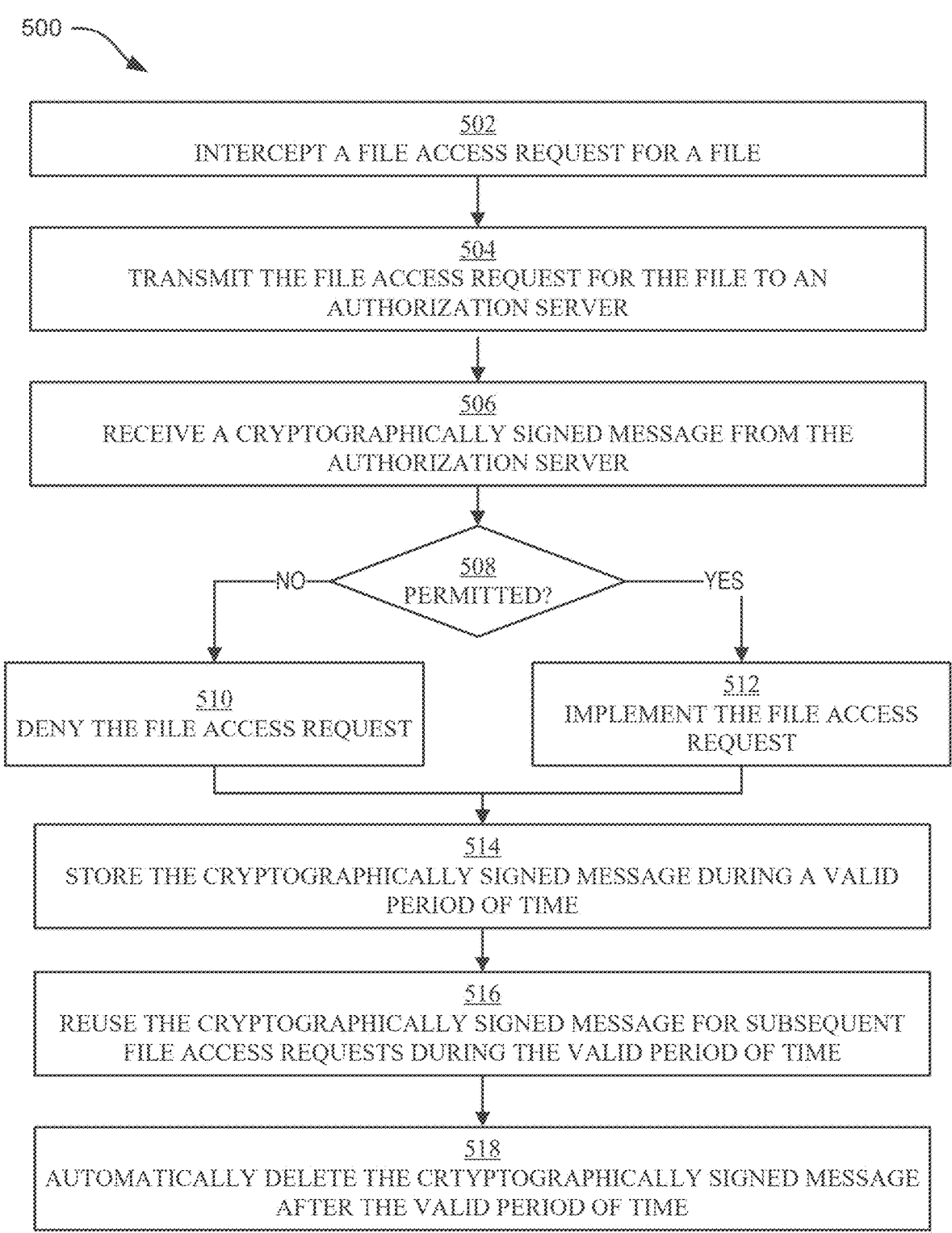
FIG. 5 illustrates a flowchart of an example method for securely using a USB device in communication with an authorization server from the perspective of the USB device, in accordance with some embodiments of the present disclosure.

FIG. 5 illustrates a flowchart of an example method 500 for securely using a USB device with an authorization server from the perspective of the USB device, in accordance with some embodiments of the present disclosure. The method 500 can be implemented by a server, a computer, a processor, or another configuration of hardware and/or software. In some embodiments, the method 500 is implemented by a USB device 102 of FIG. 1, the host 114 of FIG. 1, or a USB adapter 302 of FIG. 3.

Operation 502 includes intercepting a file access request for a file. Operation 502 can be implemented by a USB firewall of the USB device.

Operation 504 includes transmitting the file access request for the file to an authorization server. In some embodiments, operation 504 further transmits a hash (e.g., MD5, SHA-256, etc.) of the file to the authorization server together with the file access request. In some embodiments, operation 504 further transmits a hardware-generated token to the authorization server together with the file access request.

Operation 506 includes receiving a cryptographically signed message from the authorization server. Operation 508 includes determining if the cryptographically signed message allows or denies the file access request. If denied (508: NO), then the method 500 proceeds to operation 510 and denies the file access request. If permitted (508: YES), then the method 500 proceeds to operation 512 and implements the file access request.

Operation 514 includes storing the cryptographically signed message during a valid period of time. The valid period of time can be based on a predetermined amount of time (e.g., ten minutes, one hour, etc.) and/or an event (e.g., disconnecting the USB device from the host).

Operation 516 includes reusing the cryptographically signed message for subsequent file access requests for the same file by the same host during the valid period of time.

Operation 518 includes automatically deleting the cryptographically signed message after the valid period of time.

Figure 6A:
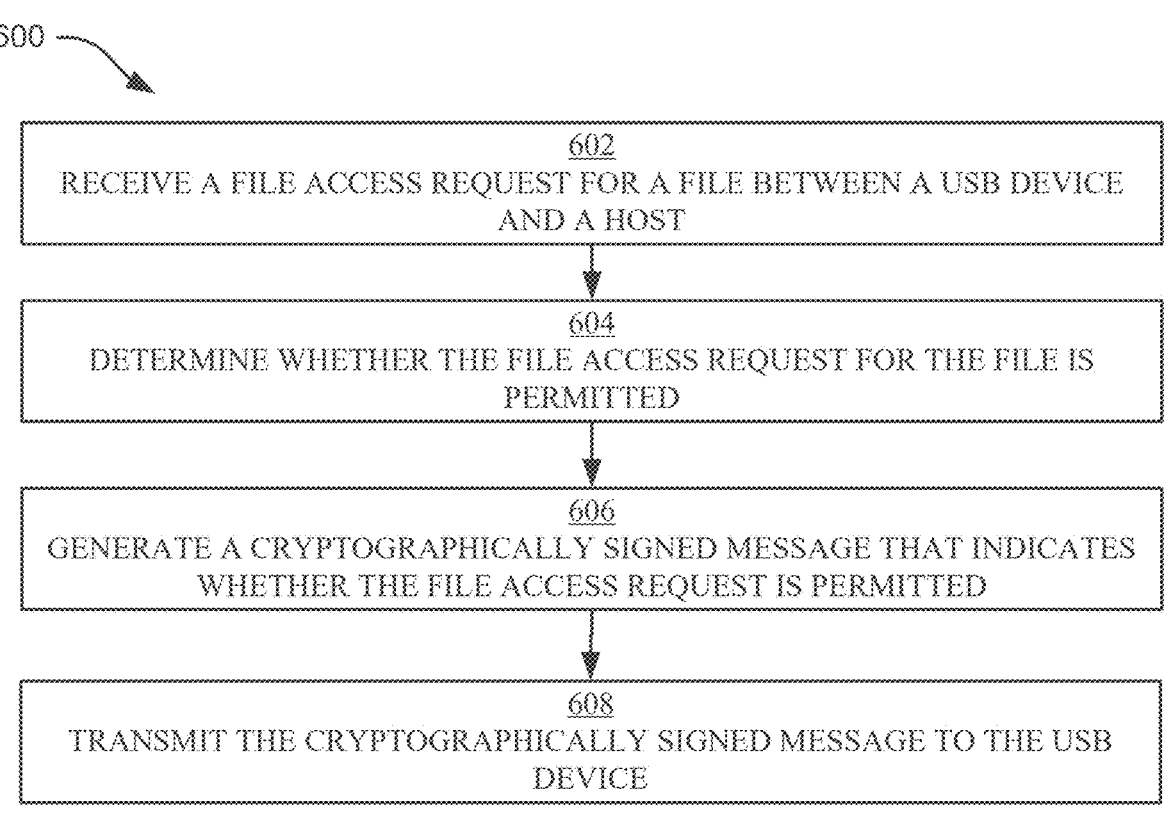
FIG. 6A illustrates a flowchart of an example method for securely using a USB device in communication with an authorization server from the perspective of the authorization server, in accordance with some embodiments of the present disclosure.

FIG. 6A illustrates a flowchart of an example method 600 for securely using a USB device with an authorization server from the perspective of the authorization server, in accordance with some embodiments of the present disclosure. The method 600 can be implemented by a server, a computer, a processor, or another configuration of hardware and/or software. In some embodiments, the method 600 is implemented by the authorization server 122 of FIG. 1 or the authorization server 304 of FIG. 3.

Operation 602 includes receiving a file access request for a file between a USB device and a host. The file access request can include, for example, a hash of the file associated with the request, a hardware authentication token, and/or other information.

Operation 604 includes determining whether file access request for the file is permitted. Operation 604 is discussed in more detail hereinafter with respect to FIG. 6B.

Operation 606 includes generating a cryptographically signed message that indicates whether the file access request is permitted. The cryptographically signed message can utilize a ECDSA algorithm, a private key, a public key, an identifier of the file (e.g., a file hash), and an indication of whether the file access request is permitted or denied. Operation 608 includes transmitting the cryptographically signed message to the USB device.

Figure 6B:
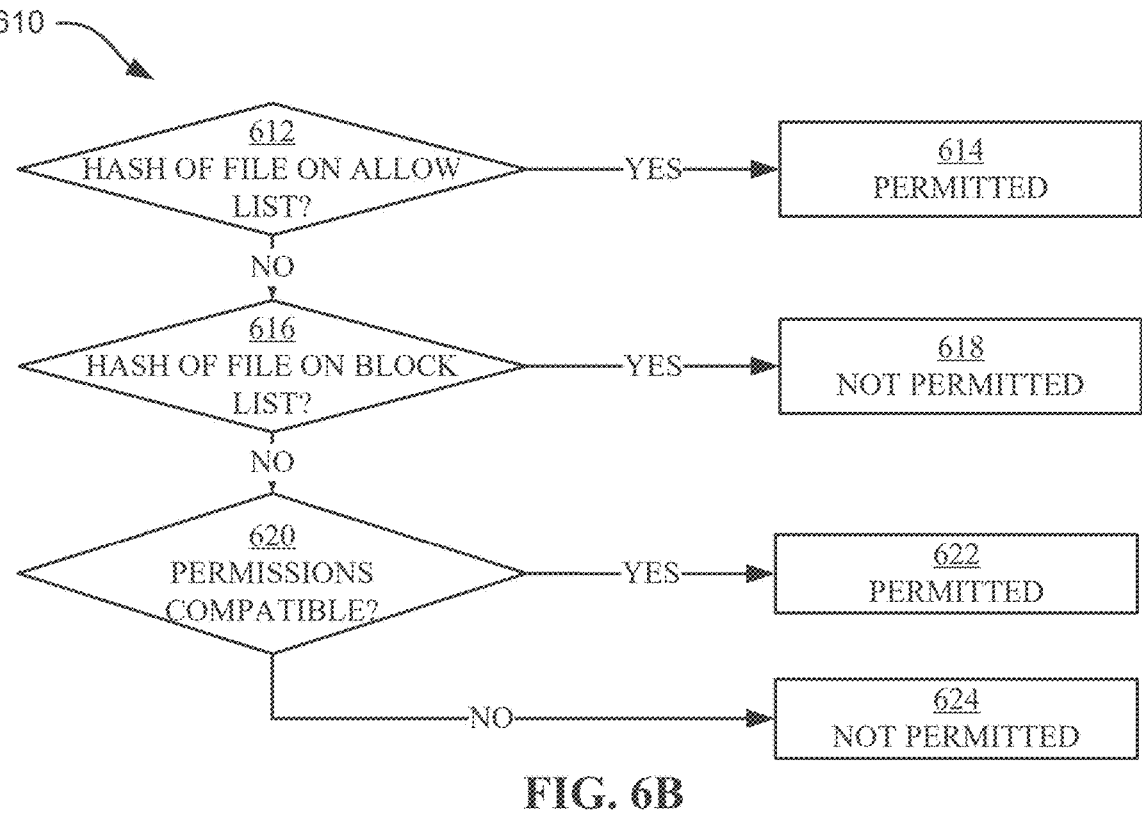
FIG. 6B illustrates a flowchart of an example method for determining whether a file access request for a file is permitted by an authorization server, in accordance with some embodiments of the present disclosure.

FIG. 6B illustrates a flowchart of an example method 610 for determining whether a file access request for a file is permitted by an authorization server, in accordance with some embodiments of the present disclosure. The method 600 can be implemented by a server, a computer, a processor, or another configuration of hardware and/or software. In some embodiments, the method 600 is implemented by the authorization server 122 of FIG. 1 or the authorization server 304 of FIG. 3. In some embodiments, the method 610 is a sub-method of operation 604 of the method 600 as described in FIG. 6A.

Operation 612 includes determining if a hash of the file is on an allow list. If so (612: YES), then the file access request is determined to be permitted in operation 614. If not (612: NO), then operation 616 includes determining if the hash of the file is on a block list. If so (616: YES), then the file access request is determined to be not permitted (e.g., denied) in operation 618. If not (616: NO), then the method 610 proceeds to operation 620 and determines if the permission levels associated with the file and the accessing device are compatible. Operation 620 can utilize, for example, a hardware-generated token and/or information within the file itself to determine whether or not permissions are compatible. If so (620: YES), then the file access request is determined to be permitted in operation 622. If not (620: NO), then the file access request is determined to be not permitted (e.g., denied) in operation 624.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 7 illustrates a block diagram of an example computing environment, in accordance with some embodiments of the present disclosure. Computing environment 700 contains an example of an environment for the execution of at least some of the computer code involved in performing the inventive methods, such as Secure USB code 746. In addition to Secure USB code 746, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and Secure USB code 746, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in Secure USB code 746 in persistent storage 713.

COMMUNICATION FABRIC 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in Secure USB code 746 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any software configured to perform any portion of the methods described previously and/or implement any of the functionalities described previously) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
intercepting, by a Universal Serial Bus (USB) firewall of a USB device connected to a host, a file access request for a file;
transmitting the file access request for the file to an authorization server, wherein the authorization server determines whether the file access request for the file is permitted based on a hash of the file; and
receiving a cryptographically signed message from the authorization server based on the hash of the file, wherein the cryptographically signed message is generated using an Elliptic Curve Digital Signature Algorithm (ECDSA) with a private key, a name of the file, and an indication of whether the file access request for the file is permitted, wherein the cryptographically signed message selectively enables permissions for a portion of the file, wherein the portion of the file is identified based on a starting offset and an ending offset in the file that is covered by the permissions, and wherein the permissions are selected from a group consisting of: read, write, and delete.

2. The computer-implemented method of claim 1, wherein the cryptographically signed message indicates that the file access request for the file is permitted, and wherein the method further comprises:
copying the file to the host in response to receiving the cryptographically signed message.

3. The computer-implemented method of claim 2, further comprising:
authenticating the USB device using a hardware-generated token of a hardware authentication device; and
wherein the copying the file to the host occurs in further response to authenticating the USB device using the hardware-generated token of the hardware authentication device.

4. The computer-implemented method of claim 3, wherein transmitting the file access request for the file to the authorization server further comprises transmitting the hardware-generated token to the authorization server.

5. The computer-implemented method of claim 4, wherein the authorization server determining whether the file access request for the file is permitted is further based on the hardware-generated token and permission information associated with the file.

6. The computer-implemented method of claim 1, further comprising:
storing the cryptographically signed message in the USB device;
intercepting, by the USB firewall of the USB device connected to the host, a subsequent file access request for the file; and
utilizing the cryptographically signed message associated with the file and the host to authorize the subsequent file access request.

7. The computer-implemented method of claim 6, further comprising:
automatically deleting the cryptographically signed message after a predetermined period of time.

8. The computer-implemented method of claim 6, further comprising:
automatically deleting the cryptographically signed message in response to disconnecting the USB device from the host.

9. The computer-implemented method of claim 1, wherein the USB firewall is implemented by USB adapter hardware.

10. The computer-implemented method of claim 1, wherein the USB firewall is implemented by USB driver software.

11. A computer-implemented method comprising:
receiving, at an authorization server communicatively coupled to a Universal Serial Bus (USB) device, a file access request for a file between the USB device and a host;
determining that the file access request for the file is permitted based on a hash of the file;
generating a cryptographically signed message that allows the file to be shared with the host, wherein the cryptographically signed message is generated using an Elliptic Curve Digital Signature Algorithm (ECDSA) with a private key, a name of the file, and an indication that the file is allowed to be shared with the host, wherein the cryptographically signed message selectively enables permissions for a portion of the file, wherein the portion of the file is identified based on a starting offset and an ending offset in the file that is covered by the permissions, and wherein the permissions are selected from a group consisting of: read, write, and delete; and
transmitting the cryptographically signed message to the USB device.

12. The computer-implemented method of claim 11, further comprising:
determining that a first authorization level associated with information stored in the file is compatible with a second authorization level associated with the host; and
wherein the cryptographically signed message is further based on determining that the first authorization level is compatible with the second authorization level.

13. The computer-implemented method of claim 12, wherein the first authorization level is based on a hardware-generated token from a hardware authentication device and wherein the second authorization level is based on a second hardware-generated token from a second hardware authentication device.

14. The computer-implemented method of claim 11, further comprising:
determining that the hash of the file matches at least one hash in a database of allowed file hashes.

15. The computer-implemented method of claim 11, further comprising:

determining that the hash of the file does not match any hash in a database of blocked file hashes.

16. A system comprising:

a Universal Serial Bus (USB) device comprising:

a USB firewall configured to intercept a file access request for a file between the USB device and a host;

a USB communication subsystem configured to transmit the file access request for the file to an authorization server and receive a cryptographically signed message from the authorization server that allows the file to be shared with the host; and a cache for storing the cryptographically signed message for a predetermined period of time; and the authorization server communicatively coupled to the USB device, wherein the authorization server is configured to determine that the file access request for the file is permitted based on a hash of the file, and wherein the authorization server is configured to generate the cryptographically signed message based on the hash of the file, wherein the cryptographically signed message is generated using an Elliptic Curve Digital Signature Algorithm (ECDSA) with a private key, a name of the file, and an indication that the file access request is permitted, wherein the cryptographically signed message selectively enables permissions for a portion of the file, wherein the portion of the file is identified based on a starting offset and an ending offset in the file that is covered by the permissions, and wherein the permissions are selected from a group consisting of: read, write, and delete.

17. The system of claim 16, further comprising:

a hardware authentication device communicatively coupled to the USB device and configured to generate a hardware-generated token associated with the file access request;

wherein the USB communication subsystem is further configured to transmit the hardware-generated token to the authorization server; and wherein the authorization server is further configured determine that the file access request for the file is permitted based on the hardware-generated token.

18. The system of claim 16, wherein the USB firewall is further configured to copy the file to the host in response to receiving the cryptographically signed message.

19. The computer-implemented method of claim 1, wherein the file access request includes an ID, a workstation name, a user name, a second factor token, a start time, an end time, a filename, an MD5 hash of the file, an SHA-256 hash of the file, and a file operation, and wherein the file operation is selected from a group consisting of: read, write, and delete.

\* \* \* \* \*